3,057,775
EMBALMING COMPOSITION
Leandro Rendon, Springfield, Ohio, assignor to The Champion Company, Springfield, Ohio, a corporation of Ohio
No Drawing. Filed Feb. 4, 1959, Ser. No. 791,050
10 Claims. (Cl. 167—49.5)

This invention relates to preservatives and more particularly to an improved embalming composition.

One of the principal objects of this invention is to provide improved embalming compositions which render body protein resistant to decay without excessive dehydration.

It is another object of this invention to provide an embalming composition which achieves natural coloration and life-like appearance in a corpse without excessive application of cosmetics.

In existing mortuary practice, formaldehyde has been the principal active preservative incorporated into embalming fluid formulations. Formaldehyde, while advantageous in some respects, is disadvantageous in that it has an astringent and harsh action, tends to cause an ashengray coloration and, possesses a pungent, irritating odor. If excessive amounts are used the body protein becomes overly dehydrated and the corpse loses its natural appearance. Dehydration is occasioned by the withdrawal of water from the protein tissue by the formaldehyde, this being the manner in which it accomplishes its preservative effect.

While the addition of modifier and control agents to formaldehyde may alleviate many undesirable side effects, such effects as the irritating odor, the searing action on the capillary bed and most of all the tendency to cause excessive dehydration remain as material problems. Thus one of the primary purposes of embalming for funeral purposes is partially defeated through the use of formaldehyde, viz. the production of a natural appearing corpse.

The present embalming compositions utilize a dialdehyde, specifically glutaraldehyde, as the preservative material. It is possible to use the glutaraldehyde either as the sole preservative material or in combination with formaldehyde to achieve a somewhat greater firming of body tissue. The glutaraldehyde does not dehydrate proteins as does the formaldehyde, but rather reacts with the proteins to change their nature and make them unsuitable as food for bacteria, and resistant to decomposition. Since glutaraldehyde is a liquid at ordinary temperatures, as compared with the gaseous condition of formaldehyde, the embalming is somewhat slower with better penetration and there are no irritating fumes present.

Glutaraldehyde, which is used as a 25% water solution, can be mixed with about 10% to 20% by weight of a monohydric alcohol such as methanol, isopropanol or a higher alcohol such as mannitol and other materials to obtain the particular firming characteristics desired. Phenol, phenolic derivatives such as paraisoamylphenol, sodium pentachlorophenate, pentachlorophenol, parachlormetacresol, and related aromatic alcohols, as well as additional germicidal compounds can be added. Suitable humectants such as glycerin, ethylene glycol, or any of the polyhydric alcohols can also be added as needed to control the moisture content of the embalming material. A non-ionic surface active agent, for example, polyoxyethylene sulfated ether, or an anionic wetting agent such as alkyl aryl sodium sulfonate may also be used according to their known abilities. Additionally, coloring agents may be added to the embalming composition to obtain the cosmetic effect desired. In connection with the coloring agents, tetrahydrofurfuryl alcohol has been found to be an excellent solvent and carrier for coloring materials used in embalming to simulate flesh-tones in tissues.

Formaldehyde, its polymers, or some of the formaldehyde condensation products, such as methylols, for example monomethylol dimethyl hydantoin, may be used in conjunction with glutaraldehyde, as by replacing part of the glutaraldehyde in the formulation, to supplement the fixative or hardening action on tissues and obtain increased firming. The added ingredients such as the carriers, etc., mentioned above merely serve as illustrations since obvious alterations can suggest themselves to those experienced in the mortuary art.

The following examples will serve to illustrate embalming compositions according to the invention, in parts by weight.

*Example I*

| | Parts by weight |
|---|---|
| Methanol | 20.0 |
| Water | 28.0 |
| Glutaraldehyde (25% solution) | 40.0 |
| Phenol (85% solution) | 6.0 |
| to which, if desired, can be added materials such as, | |
| Glycerin | 5.0 |
| Sodium-acetate | 0.5 |
| Non-ionic wetting agent | 0.5 |

*Example II*

| | |
|---|---|
| Glutaraldehyde (25% solution) | 8–12 |
| Formalin, U.S.P. | 8–25 |
| Water | 27–42 |
| Glycerin | 6–12 |
| Borax | 2– 6 |
| Methanol | 15–26 |
| Tetrahydrofurfuryl alcohol | 5–10 |
| Alkyl aryl sodium sulfonate | 0.5– 1 |

*Example III*

| | |
|---|---|
| Isopropanol | 10.0 |
| Water | 18.0 |
| Glutaraldehyde (25% solution) | 60.0 |
| Phenol (85% solution) | 6.0 |
| Glycerin | 5.0 |
| Sodium acetate | 0.5 |
| Non-ionic wetting agent | 0.5 |

*Example IV*

| | |
|---|---|
| Alcohol | 15–25 |
| Glutaraldehyde (25% solution) | 7–20 |
| Glycerin | 5–12 |
| Phenol (or related aromatic alcohols) | 6–10 |
| Borax | 2– 6 |
| Alkyl aryl sodium sulfonate | 0.5– 1 |
| Coloring, as desired. | |
| Water, q.s. (to 100%). | |

Investigations have indicated that the use of a glutaraldehyde base embalming composition can retard blood coagulation to the point that it is possible to prevent clots in the heart chambers and to keep the blood in a liquid state for a prolonged period of time. Also, the tissues are placed in a firm, yet pliable, condition with no evidence of excessive dehydration. Investigations further indicate that the present compositions give better diffusion into the tissue, better penetration, better cosmetic effects and generally better overall embalming results than have heretofore been attained on a practical basis.

While glutaraldehyde is used in amounts within the range of from 2 to 15% by weight, when it is used as the sole preservative the percentage present will not ordinarily go below 7%. On the other hand, when it is combined with formaldehyde the percentage of glutaraldehyde will not ordinarily constitute more than 8% of the total weight.

While the compositions herein described constitute preferred embodiments of the invention, it is to be understood that the invention is not limited to these precise compositions and that changes may be made therein without departing from the scope of the invention which is defined in the appended claims.

This application is a continuation-in-part of my now abandoned application, Serial No. 656,491, filed May 2, 1957.

What is claimed is:

1. An embalming composition for use in arterial and cavity embalming comprising about 10 to 20% by weight of an alcohol selected from the group consisting of methanol, isopropanol and mannitol, 7 to 12% by weight glutaraldehyde to combine with body protein and render it resistant to decomposition, and 5 to 12% by weight humectant agent for moisture control of said composition.

2. An embalming composition for use in arterial and cavity embalming comprising about 10 to 20% by weight of an alcohol selected from the group consisting of methanol, isopropanol and mannitol, 7 to 12% by weight glutaraldehyde to combine with body protein and render it resistant to decomposition, 5 to 12% by weight humectant agent for moisture control of said composition, and a non-ionic surface active agent to insure complete saturation of body tissue.

3. An embalming composition for use in arterial and cavity embalming comprising about 10 to 20% by weight of an alcohol selected from the group consisting of methanol, isopropanol and mannitol, 7 to 12% by weight glutaraldehyde to combine with body protein and render it resistant to decomposition, and about 6 to 10% by weight of germicidal material selected from the group consisting of phenol, phenolic derivatives and related aromatic alcohols.

4. An aqueous embalming composition for use in arterial and cavity embalming comprising about 10 to 20% by weight of an alcohol selected from the group consisting of methanol, isopropanol and mannitol, 7 to 12% by weight glutaraldehyde to combine with body protein and render it resistant to decomposition, 5 to 12% by weight humectant agent for moisture control of said composition, a non-ionic surface active agent to insure complete saturation of body tissue, and about 6 to 10% by weight of germicidal material selected from the group consisting of phenol, phenolic derivatives and related aromatic alcohols.

5. An arterial and cavity embalming composition having a base comprising an aqueous solution of about 2 to 15% glutaraldehyde by weight of the embalming composition, about 10 to 20% by weight of an alcoholic firming agent, and a supplementary firming agent from the group consisting essentially of formaldehyde, its polymers, and formaldehyde condensation products.

6. An embalming composition having a base comprising an aqueous solution of about 2 to 15% glutaraldehyde by weight of the embalming composition to develop a decomposition-resistant body tissue while substantially maintaining the natural coloration of the body tissue, a tissue-fixative agent consisting essentially of about 10 to 20% by weight of a lower monohydric alcohol, and a supplementary firming agent from the group consisting essentially of formaldehyde, its polymers, and formaldehyde condensation products.

7. An aqueous embalming composition for use in arterial and cavity embalming comprising by weight about 10 to 20% of an alcohol selected from the group consisting of methanol, isopropanol and mannitol, 2 to 7% glutaraldehyde to retard decomposition of body protein with no substantial unnatural discoloration thereof, and a supplementary tissue preservative agent selected from the group consisting of formaldehyde and formaldehyde condensation products including methylols to increase the firming action of said composition on the body tissues.

8. An embalming composition comprising a base consisting essentially of an aqueous solution of about 2 to 15% by weight of glutaraldehyde, about 10 to 20% by weight of an alcoholic agent for dispersing said glutaraldehyde and providing a particular firming characteristic to the body tissue and selected from the group consisting of methanol, isopropanol and mannitol, a supplementary tissue preservative agent selected from the group consisting of formaldehyde and formaldehyde condensation products including methylols to increase the firming action of said composition on the body tissues, and a surface active wetting agent for conveying said foregoing materials through the capillary and cavity system of the body for penetration of the tissues thereof by said materials for preservative combination therewith.

9. A method for preserving body tissues of a corpse comprising the step of injecting into the arterial system of said corpse a water solution including from about 2 to 15% glutaraldehyde, a tissue-fixative dispersing agent for said glutaraldehyde consisting essentially of about 10 to 20% of a lower monohydric alcohol, and a supplementary tissue preservative agent selected from the group consisting of formaldehyde and formaldehyde condensation products including methylols to increase the firming action of said composition on the body tissues.

10. The method of claim 9 in which a germicidal agent is dispersed through the corpse arterial system by said water solution concurrently with said glutaraldehyde and said agent to arrest tissue decay process.

References Cited in the file of this patent

UNITED STATES PATENTS

| | | |
|---|---|---|
| 2,113,842 | Jones | Apr. 12, 1938 |
| 2,333,182 | Jones | Nov. 2, 1943 |
| 2,801,216 | Yoder et al. | July 30, 1957 |